Jan. 12, 1960     A. N. MILSTER     2,920,451

RATIO CHANGER

Filed June 6, 1955

INVENTOR:
ARTHUR N. MILSTER

By Gravely, Lieder, Woodruff & Wills
                          ATTORNEYS.

United States Patent Office 2,920,451
Patented Jan. 12, 1960

2,920,451
RATIO CHANGER

Arthur N. Milster, Richmond Heights, Mo., assignor to Wagner Electric Corporation, St. Louis, Mo., a corporation of Delaware Application June 6, 1955, Serial No. 513,473

5 Claims. (Cl. 60—54.5)

This invention relates generally to the automotive brake art and more particularly to improvements in ratio changers for a hydraulic brake system.

The principal object of the present invention is to provide a ratio changer that is operative in response to a predetermined fluid pressure whereby fluid pressures applied in one set of brake assemblies will be maintained at a constant value, whereas fluid pressures in another set of brake assemblies will increase until a predetermined differential is established therebetween after which the differential is maintained during the remainder of the braking application.

Another object is to provide a ratio changer which is automatically and mechanically operable in response to a predetermined fluid pressure to provide a differential between the actuating pressures of front and rear wheel brake assemblies, and manually controlled means for disabling the ratio changer so that normal braking pressures may be applied to all of the brake assemblies.

These and other objects and advantages will become apparent hereinafter.

Briefly, the invention comprises a ratio changer including a piston slidably positioned in a casing and having a first surface adjacent to an outlet in the casing, a by-pass passage between an inlet and the outlet and having a spring-biased valve member positioned therein, a second passage between the inlet and a second surface of the valve member, a transverse passage intersecting the by-pass passage, and manual means slidably positioned in the transverse passage to be contacted by the valve member to render the ratio changer inoperative.

The invention also consists in the parts and in the combinations of parts and elements hereinafter described and claimed.

Figure 1:
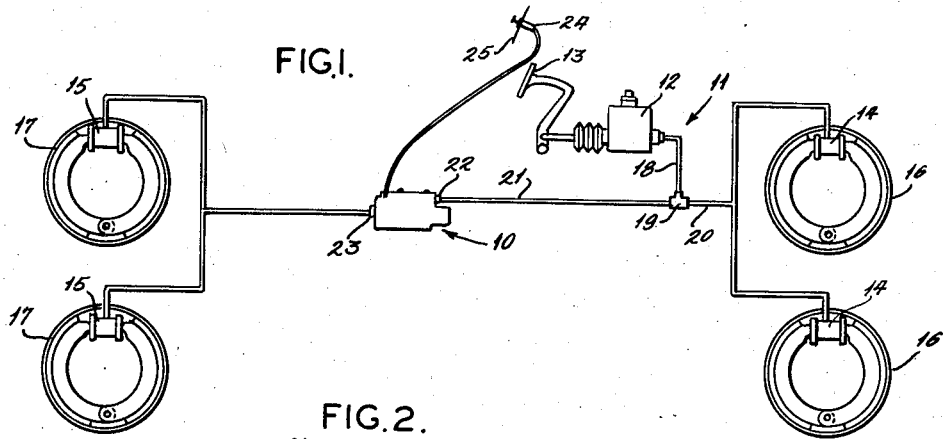
Figure 2:
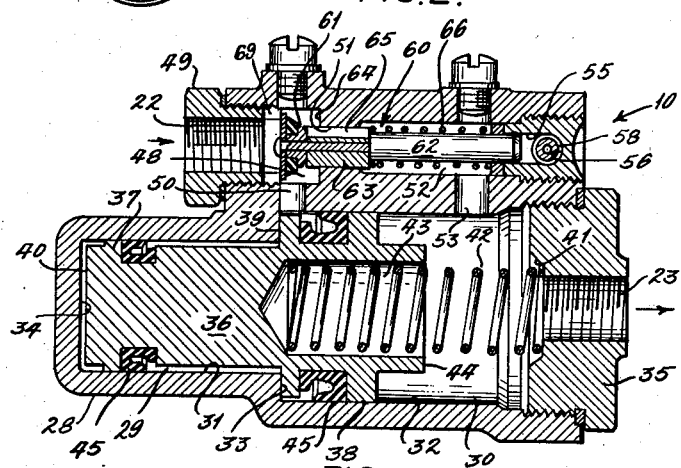
Figure 3:
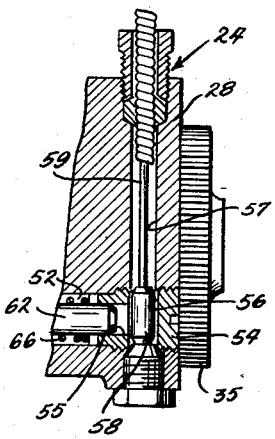
Figure 4:
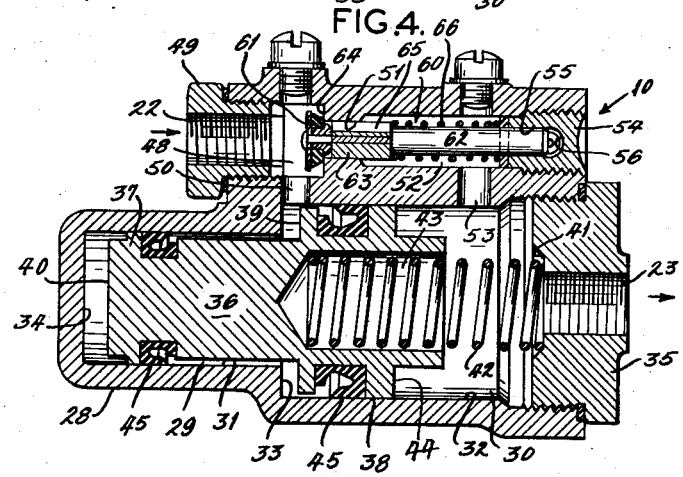

In the accompanying drawing which forms a part of this specification and wherein like numerals refer to like parts wherever they occur:

Fig. 1 is a diagrammatic view showing a hydraulic brake system including a ratio changer embodying the teachings of the present invention, Fig. 2 is a longitudinal sectional view showing the parts of the ratio changer in inoperative position, Fig. 3 is a fragmentary transverse view, partly in section, of the manual means for disabling the ratio changer, and Fig. 4 is a view similar to Fig. 2, but showing the parts of the ratio changer in operative position.

Referring to Fig. 1 of the drawing, a ratio changer 10 is shown positioned in a brake system 11 for a motor vehicle. The brake system 11 includes a conventional master cylinder 12 actuated by a foot pedal 13 to build up fluid pressure in fluid motors 14 and 15 of front and rear wheel brake assemblies 16 and 17, respectively. An outlet conduit 18 is connected between the outlet of the master cylinder 12 and a T 19, a conduit 20 connects one outlet of the T 19 to the fluid motors 14 in the front wheel brake assemblies 16 and another conduit 21 connects the other outlet of the T 19 to the fluid motors 15 in the rear wheel brake assemblies 17 of the vehicle. The ratio changer 10 is provided with an inlet 22 and an outlet 23, and is shown interposed in the conduit 21 between the master cylinder 12 and the rear wheel brake assemblies 17 so that when the ratio changer 10 is operative, a reduced braking pressure will be applied in the rear wheel brake assemblies 17 to prevent the rear wheels of the vehicle from skidding. This is the preferred application for passenger cars. However, it is apparent that the ratio changer 10 may be interposed in the conduit 20 between the master cylinder 12 and the front wheel brake assemblies 16 for use on a tractor-trailer train so that a reduced braking force will be applied to the front wheel brakes and better steering control will result therefrom. The ratio changer 10 is provided with a conventional Bowden wire control 24, which is positioned on the dashboard of the motor vehicle 25 so that the ratio changer 10 may be rendered inoperative and full braking pressures applied to all of the brake assemblies 16 and 17 of the motor vehicle, as will become apparent hereinafter.

Referring to Figs. 2 and 4, the ratio changer 10 comprises a casing 28 having a bore 29 and a counterbore 30 forming a double-diametral piston chamber, which is defined by bore and counterbore walls 31 and 32, a radial shoulder 33 extending between the adjacent ends of the bore and counterbore walls 31 and 32, a radial casing wall 34 at the other end of the bore wall 31 and an end plug 35 threadedly received in the other end of the counterbore 30. The end plug 35 has the outlet 23 formed therein, the outlet 23 being threaded for connecting the conduit 21 to the fluid motors 15 thereto. A two-step cylindrical piston 36 slidably positioned in the piston chamber is provided with a small diametral portion 37 in sliding contact with the bore wall 31 and a large diametral portion 38 in sliding contact with the counterbore wall 32. A radial shoulder 39 is formed on the piston 36 between the small and the large diametral portions 37 and 38 for abutment against the radial shoulder 33 of the casing 28. When the radial shoulder 39 of the piston 36 is in abutting relation with the radial shoulder 33 of the casing 28, the left-hand or small end 40 of the piston 36 is spaced from the radial wall 34 defining the end of the bore 29, Fig. 2. The end plug 35 is provided with an annular groove 41 about the outlet 23 for receiving one end of a spring 42, the other end of the spring being positioned in an axial opening 43 formed in the right-hand or large end 44 of the piston 36 so that the piston 36 is biased to the left with its radial shoulder 39 in abutting relationship with the radial shoulder 33 of the casing 28. Sealing rings 45 are also provided in the outer periphery of the piston 36 adjacent to each end thereof for sealing contact with the bore and counterbore walls 31 and 32.

A by-pass passage is formed in the casing 28 between the inlet 22 and the outlet 23 and includes a valve chamber 48, which is enclosed by a plug 49 having the inlet 22 formed therein. A vertical passage 50 is provided in the casing 28 between the valve chamber 48 and the counterbore 30 adjacent to the radial shoulder 33 so that the radial shoulder 39 of the piston 36 will always be in communication with the inlet 22. The by-pass passage also comprises a short bore 51 opening into the valve chamber 48 opposite the plug 49 and in axial alignment with the inlet 22, a counterbore 52 extending horizontally from the bore 51 through the casing 28 and another vertical passage 53, which intersects the counterbore 52 and extends to the counterbore 30 adjacent to the end plug 35. The counterbore 52 is enclosed to the right of the vertical passage 53 by a plug 54 having an opening 55 in alignment with the counterbore 52. A transverse opening 56 is also formed in the plug 54 at the end of the opening 55, the casing 28 being provided with a horizontal transverse bore 57 in alignment with the transverse opening 56. A stop element 58 is slidably positioned in the transverse opening and bores 56 and 57 and a cable 59 of the Bowden wire control 24 is connected to the stop element 58 so that it may be positioned across the end of the opening 55 to render the ratio changer 10 inoperative, Fig. 3.

A by-pass valve member 60 slidably positioned in the by-pass passage is provided to seal the outlet 23 from the inlet 22 during the operation of the ratio changer 10 in order to provide a differential in the fluid pressures applied to the front and rear wheel brake assemblies 16 and 17. The by-pass valve 60 includes a valve head 61 positioned in the valve chamber 48 and a valve body 62, which extends through the bore and counterbore 51 and 52. The left-hand end of the valve body 62 is enlarged, as at 63, for sliding contact with the bore 51 and the other end of the valve body 62 is slidably positioned in the opening 55 in the plug 54 so that the valve 60 is guided during movement in the by-pass passage. The radial wall of the valve chamber 48 about the bore 51 provides an abutment 64 on which the valve head 61 is seated to seal the by-pass passage. A plurality of grooves 65 or the like are formed in the enlarged portion 63 of the valve body 62 so that brake fluid may easily flow through the by-pass passage when the valve head 61 is not seated on the abutment 64. A valve spring 66 is provided to bias the valve 60 toward the inlet 22 or into open position relative to the by-pass passage when the ratio changer 10 is inoperative, the spring 66 having a pre-selected force so that the valve head 61 will not seat until a predetermined fluid pressure is exerted thereagainst, as will bcome apparent hereinafter. Inasmuch as the valve 60 is biased against the plug 49 in open position, a plurality of apertures 69 are formed in the plug 49 between the inlet 22 and the valve chamber 48 so that the flow of fluid through the inlet 22 will not be prevented by the valve 60.

It is now apparent that as long as the by-pass valve 60 is in open position, the ratio changer 10 will be inoperative and a braking application will cause fluid from the master cylinder 12 to flow through the inlet 22, the apertures 69 and the by-pass passage of the ratio changer 10 so that equal fluid pressures will be initially built up in the fluid motors 14 and 15 of the front and rear wheel brake assemblies 16 and 17. When the master cylinder 12 has developed a fluid pressure in excess of the magnitude of the force exerted by the spring 66, the valve head 61 will be moved to its closed position against the abutment 64 so that the outlet 23 is sealed from the inlet 22.

At the instant that the valve 60 is seated, the fluid pressure on the radial shoulder 39 of the piston 36 is equal to the fluid pressure on its large end 44. However, the area $A_1$ of the radial shoulder 39 is proportionately smaller than the area $A_2$ of the large end 44 of the piston 36. Accordingly, the effective pressure $P_2$ exerted on the large end 44 is proportionately larger than the pressure $P_1$ effective on the radial shoulder 39, whereby the piston 36 is restrained from rightward movement by a force that is determined by the ratio between the areas $A_1$ and $A_2$ (assuming the pressure exerted by spring 42 is negligible). Therefore, assuming the ratio of area $A_1$ to area $A_2$ to be 1 to 2, an increase in the value of $P_1$ will not be effective to move the piston 36 until the pressure ratio between $P_1$ and $P_2$ is the reciprocal of the $A_1$ to $A_2$ ratio, or 2 to 1.

As the operator further depresses the foot pedal 13 during a braking application, the pressure developed by the master cylinder 12 will be exerted in the fluid motors 14 of the front wheel brake assemblies 16 and on the area $A_1$ of the radial shoulder 39. Inasmuch as the valve 60 prevents the passage of fluid to the rear wheel brake assemblies 17 and to the area $A_2$ of the large end 44 of the piston 36, the pressure $P_2$ remains constant until the forces developed by the pressures $P_1$ and $P_2$ on the areas $A_1$ and $A_2$, respectively, are equal. However, when these forces have become equalized, a further increase in the value of pressure $P_1$ will move the piston 36 to the right thereby increasing the value of pressure $P_2$. It is of course obvious that if the area ratio is 1 to 2, the increase of $P_2$ will always be half as great as the increase of $P_1$ and the pressure ratio thus established between the front and rear wheel brake assemblies will remain constant throughout the braking application.

When the braking application is completed, the brake fluid will flow back to the master cylinder 12 from the front wheel brake assemblies 16 and the bore 29 and counterbore 30 to the left of the radial shoulder 39 until the pressure $P_1$ is reduced below the force exerted by the spring 66 on the valve 60, the piston 36 moving to the left under the force of pressure $P_2$. When the valve 60 is unseated, the brake fluid in the rear wheel brake assemblies 17 will flow through the by-pass passage to the master cylinder 12.

It is now apparent that an automatically and mechanically operable ratio changer 10 is provided for providing a differential between the actuating pressures in the fluid motors 14 and 15 of the front and rear wheel brake assemblies 16 and 17, the ratio changer 10 being operative whenever the valve stop element 58 is withdrawn from the opening 55 in the plug 54 so that the valve 60 may move to the right. When it is desired to maintain the valve 60 in open position and non-responsive to the fluid pressures developed in the inlet 22, the Bowden wire control 24 is actuated so that the valve stop element 58 is moved in the transverse opening 56 across the opening 55 of the plug 54 whereby rightward movement of the valve 60 will be prevented and full braking pressures will be applied in all of the fluid motors 14 and 15.

It is to be understood that the foregoing description and accompanying drawings have been given only by way of illustration and example, and that changes and alterations in the present disclosure, which will be readily apparent to all skilled in the art, are contemplated as within the scope of the present invention, which is limited only by the claims which follow.

What I claim is:

1. In a hydraulic brake system including a master cylinder and front and rear sets of fluid motors with conduit means therebetween, a ratio changer positioned in the conduit means between the master cylinder and one of the sets of fluid motors, said ratio changer comprising a casing having an inlet and an outlet; a piston movable in said casing and including a first surface with a large chamber adjacent thereto in communication with the outlet, a second surface in communication with the inlet, the area of said first surface being greater than the area of said second surface in a predetermined ratio; a by-pass passage between the inlet and the outlet; a by-pass valve movably positioned in said by-pass passage and having a surface area acted on by fluid pressure in the inlet for moving the by-pass valve away from the inlet to a position sealing the outlet from the inlet; a second passage intersecting said by-pass passage remote from the inlet; valve stop means in said second passage adapted to extend across said by-pass passage to provide an abutment for preventing the movement of said by-pass valve into passage sealing position; manually operable means for moving said valve stop means out of said by-pass passage; and spring-like means having a pre-selected force biasing said by-pass valve toward said inlet until the fluid pressure acting on said surface area increases to a value greater than the force of the spring-like means whereby said by-pass valve is moved into by-pass passage sealing position.

2. In a hydraulic brake system including a master cylinder and front wheel and rear wheel sets of fluid motors with conduit means therebetween, a ratio changer positioned in the conduit means between the master cylinder and one of the sets of fluid motors, said ratio changer comprising a closed casing having an inlet and an outlet; a double-diametral piston chamber in said casing including a bore and a counterbore with a radial shoulder therebetween; a two-step piston slidably positioned in said piston chamber and including a small diametral portion in said bore, a large diametral portion in said counterbore and a radial shoulder extending between said small and large portions, said large portion having a large end surface area in a predetermined ratio with the surface area of the radial shoulder of said piston, the radial shoulder being in communication with the inlet and the end surface of said large portion being in communication with the outlet; yieldable means between said piston and the outlet for spacing the former from the latter; a by-pass passage in said casing between the inlet and the outlet exterior of said piston chamber, said by-pass passage including a valve chamber adjacent to the inlet; a by-pass valve for sealing the outlet from the inlet and including a valve head in said valve chamber adjacent to the inlet and a valve body in said by-pass passage; a second passage extending transversely of said by-pass passage at the end opposite from the inlet; a valve stop element positioned in said second passage and movable across the end of said by-pass passage whereby said valve body will contact said valve stop element and prevent said valve head from sealing said by-pass passage; manually operable means for moving said valve stop element across said by-pass passage to maintain said valve head in open position and render said ratio changer inoperative; and a spring urging said by-pass valve toward the inlet and away from passage sealing position, said spring exerting a pre-selected force for maintaining said valve in open position relative to said by-pass passage until a predetermined fluid pressure acting on said valve head in opposition to the force of said spring is developed in the inlet to move said by-pass valve into passage sealing position.

3. A ratio changer for a hydraulic brake system, comprising a casing having an inlet and an outlet, a piston chamber in said casing in communication with the outlet; a piston slidably positioned in said piston chamber and having a first surface in communication with the inlet and a second surface in communication with the outlet, said surfaces having predetermined areas; passage means in said casing between the inlet and the piston chamber exterior of said piston, said passage means including a valve chamber adjacent to the inlet; a by-pass valve for closing said passage means to seal the piston chamber from the inlet, said by-pass valve including a valve head in said valve chamber and a valve body in said passage means; yieldable means biasing said valve head toward the inlet and away from closed position in said passage means, said yieldable means having a pre-selected force maintaining said valve head in open position until a fluid pressure in excess of the force of said yieldable means is provided in the inlet whereby said valve means will be moved into passage sealing position; said piston being movable toward said outlet in response to increases in the inlet fluid pressure above a predetermined pressure greater than the value required to close said valve head; and manual control means including a wire control having a valve stop element at one end, the stop element being slidably positioned in a passageway intersecting said passage means whereby the valve body will contact said stop element to maintain the valve head in open position.

4. A ratio changer for a hydraulic brake system, comprising a casing having an inlet and an outlet, a piston chamber in said casing in communication with the outlet; a piston slidably positioned in said piston chamber and having a first surface in communication with the inlet and a second surface in communication with the outlet, said surfaces having predetermined areas; passage means in said casing between the inlet and the piston chamber exterior of said piston, said passage means including a valve chamber adjacent to the inlet; a by-pass valve for closing said passage means to seal the piston chamber from the inlet, said by-pass valve including a valve head in said valve chamber and a valve body in said passage means; yieldable means biasing said valve head toward the inlet and away from closed position in said passage means, said yieldable means having a pre-selected force maintaining said valve head in open position until a fluid pressure in excess of the force of said yieldable means is provided in the inlet whereby said valve means will be moved into passage sealing position; said piston being movable toward said outlet in response to increases in the inlet fluid pressure above a predetermined pressure greater than the value required to close said valve head; and manual control means adapted to contact said valve body to maintain the valve head in open position and render said ratio changer inoperative.

5. A ratio changer for a hydraulic brake system comprising a casing having an inlet and an outlet, a piston chamber in said casing in communication with said outlet, a piston positioned in the casing for slidable movement into said piston chamber and having a first surface in communication with the inlet and a second surface in communication with the piston chamber, a by-pass passage in said casing between the inlet and piston chamber exterior of said piston, a valve biased toward an open position in said passage by a spring of pre-selected force and being movable only in response to fluid pressure in said inlet for closing said passage to interrupt communication between said inlet and outlet whereby said piston is movable in response to a predetermined increase in said inlet pressure, and manually controlled means adapted to be moved to a position preventing movement of said valve in response to inlet fluid pressures for maintaining said passage open whereby said piston is inoperative.

References Cited in the file of this patent

UNITED STATES PATENTS

| | | |
|---|---|---|
| 2,144,020 | Hunt | Jan. 17, 1939 |
| 2,207,173 | Goepfrich | July 9, 1940 |
| 2,218,194 | Freeman | Oct. 15, 1940 |
| 2,340,462 | Gallup et al. | Feb. 1, 1944 |
| 2,463,173 | Gunderson | Mar. 1, 1949 |
| 2,526,968 | Pontius | Oct. 24, 1950 |

FOREIGN PATENTS

| | | |
|---|---|---|
| 1,055,956 | France | Oct. 21, 1953 |
| 444,955 | Great Britain | Mar. 30, 1936 |